United States Patent Office 3,009,047
Patented Nov. 14, 1961

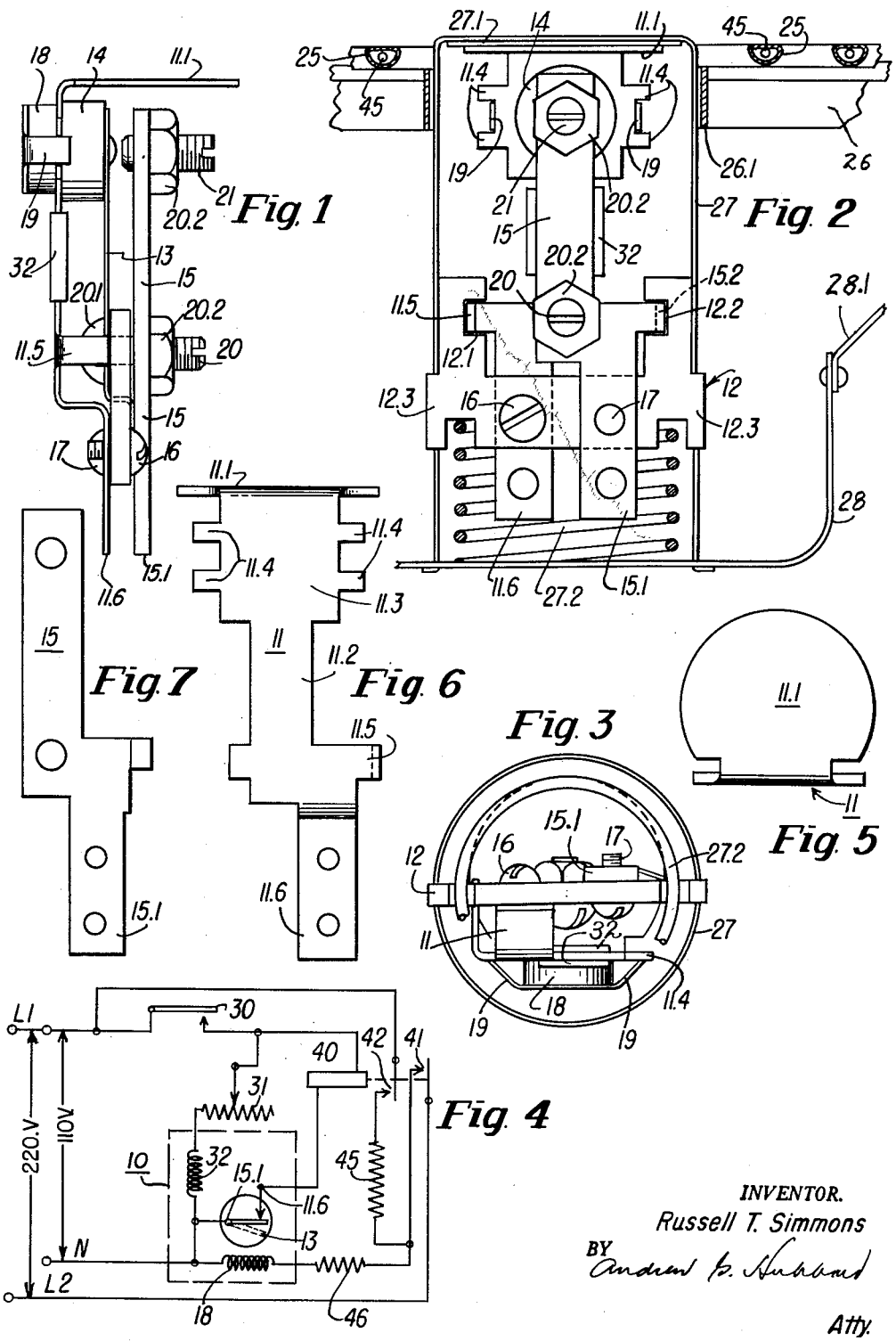

3,009,047
TEMPERATURE RESPONSIVE CONTROL DEVICE
Russell T. Simmons, Lombard, Ill., assignor to General Electric Company, a corporation of New York
Filed Oct. 9, 1959, Ser. No. 845,476
12 Claims. (Cl. 219—20)

This invention relates to control devices and more particularly to such devices as may be used to maintain a uniform output temperature from a heat source.

In utilizing the heat, as for example, from an electric range for such purposes as cooking, baking, boiling, etc., it has become standard to cycle the heat supplied under the control of one or more thermo-sensing devices. The devices used and the circuitry required are to a large extent dependent on the amount of temperature variance allowable by the element being subjected to the source heat. Thus, in cooking within an oven or in some other enclosed area, a considerable degree of temperature variation is allowable; for example, it may vary as much as 10° F. to 15° F. without harmful effects. In surface cooking, the amplitude of the temperature variations must be more exactly controlled, in some instances to within a degree. It is therefore the prime object of the present invention to provide a simple thermo-sensing control which is capable of providing the precise control required by specific applications.

Another object of the invention is to provide a cycling type of thermostatic control which uses as its thermosensing medium a circuit element fabricated from the family of temperature compensating alloys of nickel and iron.

A further object of the invention is to provide a permanent magnet and paramagnetic keeper as circuit elements of a temperature control device, the keeper being of such a type that it loses its paramagnetic characteristics at temperatures elevated above a predetermined temperature and regains its paragmagnetic qualities at a temperature lower than the predetermined temperature.

It is a still further object of the invention to provide in a thermosensitive control device, a thermally responsive magnetic control actuator having a secondary heat source for the magnetic keeper bracket which will cause the keeper to release its attracted magnet as the temperature of the bracket is approaching its Curie temperature; in effect minimizing the upward swing of the temperature after the heat source is turned off.

Other objects, features and advantages of the invention will be apparent from the detailed description of a presently preferred embodiment thereof, read in connection with the accompanying drawings in which:

FIG. 1 is a side elevational view of the sensing head assembly of a temperature control device embodying the invention;

FIG. 2 is a front elevational view of the sensing head assembly of FIG. 1 encased within the mounting structure necessary to install the device in an operating environment such as a range surface unit;

FIG. 3 is a bottom view of the assembly of FIG. 2;

FIG. 4 is a schematic diagram of the control circuit utilizing the present invention;

FIG. 5 is a top plan view of the magnetic keeper bracket;

FIG. 6 is a rear elevational view of the keeper bracket, without the heating coils normally mounted thereon; and FIG. 7 is a rear elevational view of the backing plate.

Mechanically speaking, the control device comprises a thermo-sensitive assembly 10 having as its elements: magnetic keeper bracket 11, support 12, armature spring 13 bearing magnet 14, and backstop arm 15. The assembly is held together by means of screws 16 and 17 in the manner of a relay type spring pileup, with keeper bracket 11, magnet bearing armature spring 13 and backstop arm 15 extending in superimposed spaced relationship from the insulator and the securing screws.

Keeper bracket 11 is a generally L-shaped, rigid metal structure made of an alloy of nickel-iron. It has long been known that ferromagnetic materials such as nickel and iron exhibit extraordinary charcteristics when subjected to elevated temperatures. The characteristic with which the present invention is most concerned is the magnetic inversion or Curie temperature. The Curie temperature of a paramagnetic metal or alloy is the temperature above which the alloy loses its paramagnetic quality and exhibits instead diamagnetic qualities. The Curie temperature of ferromagnets made of the nickel-iron alloys, for example, is in direct relationship to the percentage of nickel in the alloy, as shown on page 45 of "Alloys of Iron and Nickel" by J. S. Marsh published by McGraw-Hill in 1938. From this reference work, it can readily be seen that for each percentage of nickel in an alloy, a different Curie temperature exists. Thus, when the Curie temperature is to be the determining factor in the control of such operations as cooking, baking and broiling where a maximum temperature of about 550° F. is required, alloys having 35% or more of nickel must be used. As a measure of consistency, it will be assumed throughout this disclosure that an alloy having an inversion temperature of 550° F. is used.

Although these inversion temperature characteristics have been known for many years, the use of such alloys as temperature control elements has been restricted because of the inability of the ferromagnet to demonstrate the necessary consistency, reversibility and accuracy throughout the control temperature. The present invention overcomes the deficiences of earlier control devices based on magnetic inversion, whereupon these nickel-iron alloys are now capable of being used as temperature sensing elements where a high degree of precision is required.

Returning to the specific construction of the sensing head assembly—that is, the principal temperature-responsive structure of the control device—there is shown in FIGS. 1, 2 and 3, the assembly; and in FIGS. 5 and 6, the magnetic keeper bracket 11 in detail. The bracket includes at its upper end a heat exchange head 11.1, which may advantageously be in the form of a truncated circular plate extending at a right angle from the central body portion 11.2. Immediately below the head 11.1, so as to be quickly responsive to the temperature changes thereof, body portion 11.2 is formed to a have a rectangular keeper 11.3 from which extends on either side a pair of ears 11.4. Toward its lower end, the bracket 11 has an angled arm 11.5 which has as its primary use physical stabilization of the assembly. The lower portion 11.6 of bracket 11 is formed as a terminal leg at which the bracket may be connected into the electrical control circuit, as later described.

The ears 11.4 of the keeper 11.3 provide a convenient means for the mounting of a small heat coil 18 which may be called herein an anticipator coil in view of its circuit function. The coil is small in size and by the use of spring clip 19 fastened between ears 11.4 may be firmly held against the keeper 11.3 to maintain a good thermal conductivity relationship therewith.

A permanent magnet 14 is arranged in operative association with the keeper 11.3 so as to form therewith a switching device in the control circuit. The magnet 14, which may be of generally cylindrical shape is secured in any known manner to the free end of a resilient armature spring 13, and is biased to withdraw the magnet 14 from the keeper 11.3 under certain operating conditions. The spring is normally tensioned such that it does not overcome the attraction of magnet 14 to paramagnetic keeper 11.3 until the keeper approaches its responsive or diamagnetic state. The amount of the counter-attractive force of armature spring 13 may be adjusted by means of adjusting screw 20, the head 20.1 of which is positioned to advance against the spring as indicated in FIG. 1. The conventional locknut 20.2 maintains the adjustment.

The final operative member of the assembly is the backstop 15 shown in plan view in FIG. 7. The backstop is preferably a rigid, non-magnetic metal, having at its free end a threaded portion into which is threaded the adjustable diamagnetic backstop screw 21. The backstop screw may be adjusted to limit the travel of the magnet 14 resulting from the bias of spring 13 during the period of non-attraction of bracket 11. A leg 15.1 provides for the electrical connection of the backstop and therewith associated spring 13 into the control circuit.

The elements 11, 13 and 15 are mounted on a support 12, formed of an insulating material such as "lava" or the like, capable of withstanding high temperature. As appears in FIGS. 1 and 2, bracket 11 is secured to the support by the screw 16 passing therethrough; and to maintain the bracket against rotation, the arm 11.5 enters the notch 12.1 of the support. Spring 13 and backstop 15 are in stack relationship, jointly secured to the support by screw 17 passing therethrough. Backstop 15 is held against rotation by a portion 15.2 entering the notch 12.2 of the support.

Thermo-sensing unit 10 as shown includes a normally closed electrical path from terminal leg 11.6 through the bracket 11, magnet 14 and armature spring 13, and terminal leg 15.1 of the backstop arm 15. Backstop 15 is in electrical contact with the armature spring 13 within the stack and both are insulated in the stack assembly from keeper bracket 11 by means of insulator 12. By a simple and obvious rearrangement of the insulation between the parts, a normally open circuit could be arranged in which the backstop arm would serve as one circuit component and the backstop would be insulated from the other circuit element, the armature spring. In this way, the keeper bracket and the magnet would be isolated from the actual electrical circuit. On the change of condition occasioned by the bracket reaching its Curie temperature, the tension in the armature spring would cause the armature spring to move away from the keeper bracket and into contact with the backstop arm. A circuit would thereby be closed from the backstop arm through the adjusting screw to the armature spring and a suitable terminal.

As mentioned in the previous paragraph there is a normally closed circuit from bracket 11, through magnet 14, armature spring 13 to backstop arm 15. This circuit is opened when the keeper bracket is heated to a temperature at about the Curie temperature of the alloy being used. The keeper bracket thereupon becomes diamagnetic. As this bracket becomes diamagnetic the attractive force exerted by magnet 14 on the bracket is released. The magnet bearing spring 13 by virtue of its biasing or tensioning will restore to a position where the spring contact is resting against backstop screw 21. In this position the circuit between bracket 11 and backstop 15 is opened.

When the keeper bracket has cooled below its inversion temperature, bracket 11 changes its state from diamagnetic to paramagnetic and the attractive force of the magnet closes a complete magnetic path through the now receptive bracket 11. Magnet 14 moves toward bracket 11 overcoming the spring bias of armature spring 13 and contacts bracket 11 to re-complete the electrical circuit previously disclosed. Thus, although the keeper bracket is stationary and the magnet movable; the effect of the attractability and non-attractability of the bracket moves the magnet consequent to these changes in the magnetic state of the keeper bracket.

In order for either embodiment to be effective, the thermo-sensitive assembly 10 must be installed so that its heat exchange head 11.1 may respond to the change in temperature of a body whose temperature is to be controlled. In FIG. 2 is shown a representative method of mounting the sensing head assembly for use in conjunction with an electric range surface heating unit comprising a tubular sheathed resistance unit 25 supported on a spider 26 mounted in the range cooking top (not shown) as is common in the art. The spider provides a central opening 26.1 which accommodates a cylindrical heat shield 27 which is telescopically mounted on a U-shaped bracket 28 having means such as the upwardly and outwardly extending arms 28.1 by means of which the bracket 28 is attached to the spider 26 or other convenient element of the cooking range. The heat shield receives the sensing unit 10 by way of the support 12, in which the upper walls of the support fit snugly against the interior of the heat shield and the side wall extensions 12.3 extend through slots in the shield. The support 12 thus secures the unit 10 immovably within the shield, with the heat exchange head 11.1 in surface contact with the top 27.1 of the shield throughout the area of the head 11.1. A coil spring 27.2 bottomed on the bracket 28 resiliently lifts the shield to position its top 27.1 slightly above the heating element 25, whereby when a cooking vessel (not shown) is placed on the heating unit, the top of the shield is resiliently maintained against the bottom of the vessel, thus insuring good heat transfer to the head 11.1. The shield 27 protects the unit 10 against radiant heat from the heating unit, whereby the bracket 11 is responsive essentially only to the temperature of the cooking vessel.

The electrical circuit for controlling such a surface unit is shown in FIG. 4. Pursuant to conventional practice, the main resistance heating element 45 is connected into a 3 wire Edison circuit with 220 volts across the outer leads L1 and L2 and 110 volts across either of the intermediate circuits L1 to N and L2 to N. In one of the outer leads L1 is a series connected On-Off switch 30 of any known single-pole, single-throw variety. Across the intermediate 110 volt line L1 to N is a circuit including the aforementioned On-Off switch 30, adjustable resistor or potentiometer 31, and a heat coil 32. In parallel with this circuit is a second circuit including switch 30, electro-magnetic relay 40, and normally closed thermosensitive device 10. Relay 40 has two sets of contacts 41 and 42 which are used to control the operative connection of the heating unit resistance element 45 to the 220 volt leads L1 and L2.

If as previously pointed out, a normally open circuit thermo-sensing unit is used in place of normally closed sensor 10, the necessary change in circuitry is quite obvious. For example, instead of having the normally closed sensor 10 in the series circuit to relay 40, the normally open sensor and a suitable resistor could be used to shunt down relay 40 on the release of the magnet from the keeper due to the bracket reaching its Curie temperature. This alternative would in no way change the operative character of the preferred embodiment as generally explained herein.

A final circuit path can be traced from lead L2, through contacts 42, current-limiting resistor 46 and anticipator heat coil 18 to lead N. The anticipator coil 18 while necessary for the sensitivity and delicate control required for surface unit, could most probably be omitted when the heat unit 45 being controlled represents an oven heating element in which a wider amplitude of temperature control is acceptable.

Thermo-sensitive assembly 10 must be placed physically as close as possible to the element being heated, as mentioned. Further, heating coils 18 and 32 both are utilized to heat the keeper section 11.3; therefore to operate with maximum effectiveness, these auxiliary heating coils 32 and 18 should be positioned as close physically to the keeper section as is possible. Thus as shown in FIGS. 1 and 2, coil 18 is secured directly to keeper section and coil 32 is wound about or mounted to the central portion 11.2 of bracket 11.

The purpose of each of the heat coils is different and each will be explained separately. As mentioned, heat coil 32 and potentiometer 31 form a circuit across the 110 volt source. The potentiometer is used to vary the current flowing in the heat coil. By varying the current to the coil, the heat output of coil 32 can be controlled. The heat output of coil 32 which may be called the base temperature heat coil, is used to raise the temperature of the keeper section 11.3 to an intermediate base temperature, whereupon the temperature of the keeper section need not depend wholly on heat conduction from the head 11.1. The added heat energy from the main heater 45, transmitted from the head 11.1 to the keeper section 11.3 need only raise the temperature of the keeper section from said base temperature to the Curie temperature of the alloy. The Curie temperature of each specific alloy, as noted, is incapable of variation; hence to provide for the numerous different output temperatures required of an electric range, the base temperature must be varied to provide this variability. To illustrate this point, various cooking operations require a specific temperature for the best performance. Thus, if an operation requires that the foodstuff in the vessel be controlled at 350° F. and we have a sensor which changes its state at 550° F., the heating element 32 must add its heating effort to that provided by heat transfer from the cooking vessel to the keeper, for it is obvious that the cooking vessel alone could bring the keeper temperature only to slightly less than 350° F. It will be understood that the potentiometer 31 will be conveniently disposed for manual operation by the cook, and that it will have an index pointer and scale (not shown) marked at various cooking temperatures or common cooking terms. The cook thus establishes the heat output of the element 32 without conscious effort.

For the purpose of explaining the function of the anticipator coil, it will be easiest to explain the functioning of a circuit without the anticipator coil. It is assumed that heater element 45 is in operation; sensor 10 is being heated to the Curie temperature of the alloy being used. The temperature of the heated utensil will, of course, increase at a faster rate than the keeper element 11.3 because of the imperfect heat transfer from the vessel to the head 11.1 and from the head to the keeper. Further, the keeper 11.3 has a time lag or time constant between reaching the temperature of inversion and reacting to it. Thus when the keeper finally completes its change of state so as to release the magnet 14 and its bearing spring 13 and open the heating unit switch contacts, the heated utensil is at a temperature above that desired. Further, the temperature of the heated utensil continues to rise for a period of "overshoot" after the source of heat has been removed, because of the residual heat in the heating element. This residual heat is sometimes referred to in the art as the "Heat Inertia" of the element. It has been found that the amplitude of this overshoot and the subsequent undershoot before the heat source is returned to operation may be as great as 10°–15° F. Such an amplitude range is unacceptable for many operations including those as simple as boiling water.

With the anticipator coil 18 in the circuit, the keeper 11.3 in addition to being subjected to heat from main heating unit 45 and base heater 32, is also heated by coil 18. In this way, the keeper is heated beyond its change of state temperature by coil 18 while the heated utensil is just reaching the desired control level temperature. By using this additional heat coil 18, the temperature of the heated element may be allowed to coast up to the control temperature after the heat source has been rendered inoperative at a slightly lower temperature, in effect holding the temperature overshoot to a minimum.

Referring next to the circuit of FIG. 4, there will be described as an example, the operation of boiling water. The water-bearing utensil would be placed on the surface unit 25, whereby the bottom of the utensil is in physical contact with the top of the shield 27 and thus in heat transfer relation to the head 11.1 of temperature sensitive bracket 11. The potentiometer index is set at "boil" or its temperature equivalent, thus establishing the proper resistance value of the potentiometer.

To initiate the operation, On-Off switch 30 is closed. A circuit is thereby closed through potentiometer 31 and base temperature heat coil 32 to the 110 volt source. Coil 32 is energized to the extent necessary to supply enough heat to raise the temperature of the keeper 11.3 to a base temperature of (550°—212°=338° F.) 338° F., in order to achieve a resultant control temperature of 212° F. Also on closure of switch 30, a circuit is closed from the 110 volt source through electro-magnetic relay 40 and normally closed circuit established by the engagement of the magnet 14 with the keeper 11.3. This relay closes its contacts 41 and 42, placing heating unit 45 across the 220 volt source and placing fixed resistor 46 and anticipator coil 18 across the 110 volt source. Heater 45 then heats the heated utensil, and by heat transfer from the utensil to the head 11.1, the keeper 11.3. As the heated utensil approaches 212°, the keeper has received sufficient heat from base temperature heat coil 32 to raise its temperature to 338° F. and from heater 45 to raise it a little less than 212 additional degrees. Anticipator coil 18 has raised the keeper temperature an additional amount to raise the bracket temperature above 550° F. just before the 212° F. temperature is reached by the utensil. As the thermo-sensitive bracket passes its inversion temperature, it becomes diamagnetic whereupon the magnet spring 13 is able to withdraw the magnet from the keeper, opening the circuit to relay 40. The relay restores, releasing its contacts 41 and 42. Opening of these contacts shuts off heating coil 45 and anticipator coil 18. The heated utensil then slowly cools down, and keeper 11.3 eventually cools below its inversion temperature, whereupon it changes state once again and becomes paramagnetic causing magnet 14 to attract, reclosing its circuit. Relay 40 is re-energized and consequently heater 45 and coil 18 are again operated. Heating coil 45 again begins to re-heat the utensil until such time as sensor 10 re-opens. It has been found that with a circuit such as has been described herein, temperatures of the utensil may be controlled within an amplitude of 1° F. This cycling continues until the completion of the boiling, at which time On-Off switch 30 is opened.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. A device for controlling an electric circuit by regulating the thermal output of a heat source in response to temperature changes in an element subject to said heat source comprising: temperature sensitive means located in physical proximity to said element to commonly share the temperature of said element and comprising a two state member having paramagnetic characteristics in a first of said states and having diamagnetic characteristics in the second of said states, said member being responsive to temperatures of said element below a predetermined temperature for remaining in said first state and to temperatures of said element above said predetermined temperature for remaining in said second state, said member being reversibly sensitive between said two states; a magnet, means for mounting said magnet for attraction to said member during the paramagnetic condition thereof and for withdrawing from said member during the diamagnetic condition thereof, and means for completing a circuit through said member and said magnet mounting means to said heat source to effect the increase of temperature.

2. A device for controlling an electric circuit by regulating the thermal output of a heat source in response to temperature changes in an element subject to said heat source comprising: temperature sensitive means located in physical proximity to said element to commonly share the temperature of said element and comprising a two state member having paramagnetic characteristics in a first of said states and having diamagnetic characteristics in the second of said states, said member being responsive to temperatures of said element below a predetermined temperature for remaining in said first state and to temperatures of said element above said predetermined temperature for remaining in said second state, said member being reversibly sensitive between said two states, a magnet, means for mounting said magnet for attraction to said member during the paramagnetic condition thereof and for withdrawing from said member during the diamagnetic condition thereof, and means for completing a series circuit through said member and said magnet mounting means responsive to the movement of said magnet in one direction relative to said member to activate said heat source in a condition effecting the increase of the temperature of said element, said magnet mounting means biased to move said magnet in the opposite direction to inactivate said heat source on said member achieving said second state to open said series circuit, and means operative on said completion and opening of said series circuit whereby said heat source is cycled to maintain the temperature of said element at a desired control level.

3. A control device as claimed in claim 1, in which said member is fabricated from a nickel-iron alloy containing not substantially less than thirty percent nickel.

4. A control device as claimed in claim 1, in which said magnet mounting means comprises a resilient member biased to withdraw said magnet from said member when said member is in said second state.

5. A device for controlling an electric circuit by regulating the thermal output of a heat source in response to temperature changes in an element subject to said heat source comprising: temperature sensitive means located in physical proximity to said element to commonly share the temperature of said element and comprising a two-state member having paramagnetic characteristics in a first of said states and having diamagnetic characteristics in the second of said states, said member being responsive to temperatures of said element below a predetermined temperature for remaining in said first state and to temperatures of said element above said predetermined temperature for remaining in said second state, said member being reversibly sensitive between said two states; a magnet, means for mounting said magnet for attraction to said member during the paramagnetic condition thereof and for withdrawing from said member during the diamagnetic condition thereof, and further including a second heat source having a comparatively low thermal output as compared to said first mentioned heat source, said second mentioned source positioned in heat exchange relation to said member for elevating the temperature of said member above the temperature of said element, and presettable means for energizing said second heat source for governing the amount of heat supplied therefrom to said member whereby the differential between the temperature of said member and the temperature of the element is the result of the heat from said first mentioned source.

6. A control device as claimed in claim 5 further comprising a third heat source positioned proximately to said member, said third source operatively governed by said control means to heat said member only while said member is in the one of said states effecting the increase in the temperature of said element, said third source operative to elevate the temperature of said member to its diamagnetic temperature state before the element reaches said control level temperature to allow said element to slowly reach said control temperature by reason of the heat inertia of said heat source after the diamagnetic condition of said member has operated said control to effect the temperature decrease of said element.

7. A device for sensing and reacting to temperature change in an object being heated by the operation of a heat source comprising: a heat conducting bracket having intimate thermal contact with said object to share the temperature of said object, a member of said bracket constructed of material having a normal paramagnetic state and having a diamagnetic state at temperatures elevated above an inversion temperature, a magnet attracted to said member with said member in the paramagnetic state and not attracted with the member in the diamagnetic state; and means controlled by the attraction and non-attraction of said member for opening and closing an electrical circuit, said control means comprising as a circuit component an armature spring resiliently bearing said magnet and moving said magnet toward magnetic contact with said member when said member is in the paramagnetic state, said armature tensioned to move said magnet away from said member with said member in the diamagnetic state, and circuit means governed by the movement of said armature spring to control the operation of said heat source.

8. In a device as claimed in claim 7, means for varying the tension in said armature to thereby govern the effective attractive force of said magnet to said member, and means for arresting the travel of said magnet away from said member with said member in the diamagnetic state and completing a circuit from said armature spring to said arresting means.

9. In a device as claimed in claim 7, said bracket including a head section positioned for efficient thermal conductivity with said object being heated, a secondary heat coil secured to said bracket proximately to the area of magnetic contact of said member with said magnet, said secondary heat coil operative continuously to raise the temperature of said member a presettable amount above the temperature of said object being heated, a tertiary heat coil secured to said member directly in the area of magnetic contact with said magnet and operative to additionally raise the temperature of said member, said circuit means controlled by the change of state of said member when said member is raised above said inversion temperature for rendering said heat source and said tertiary heat coil inoperative, thereby allowing the temperature of said object to cool to a predetermined temperature and allowing said member to cool below its inversion temperature.

10. A device for sensing and reacting to temperature changes in an object being subjected to heat input from one heat source, said device comprising a heat conductive member, means for mounting said member in intimate heat transfer relationship with said object, said member being constructed of material paramagnetic within a first temperature range and diamagnetic within a second temperature range, a magnet spring means for mounting said magnet for attraction to said member during the paramagnetic state thereof and for withdrawing said magnet therefrom during the diamagnetic state thereof, an electrical circuit for energizing said one heat source, means controlled by the attraction of said magnet to said member for closing said electrical circuit and by the separation of said magnet therefrom to open said electrical circuit, a secondary heat source of comparatively lesser heat input capability than said one heat source, said secondary heat source being disposed in good heat transfer relation with said member, and circuit means including the energy circuit for said first-named heat source for concurrently energizing said first and second heat sources to thereby raise the temperature of said member more rapidly than solely by heat conduction from the object being heated, whereby said member attains said diamagnetic temperature range while said object is at a lower temperature level.

11. A device for sensing and reacting to temperature changes in an object being subjected to heat input from a first heat source, said device comprising structure having a heat conductive member, means for mounting said member for engagement with said object for good heat transfer therebetween, said member being constructed of material normally paramagnetic but becoming diamagnetic at temperatures above a predetermined level, a magnet means for mounting said magnet whereby it is attracted to said member during the paramagnetic condition thereof and is withdrawn from said member during the diamagnetic condition thereof, an electrical circuit for energizing said first heat source, means including said member and said magnet for respectively closing and opening said electrical circuit according to the magnetic condition of said member and the resultant attraction or withdrawal of said magnet relation thereto, a secondary heat source of comparatively lesser heat input capability than said one heat source, said secondary heat source connected in good heat transfer relation with said member, circuit means including said first heat source circuit for concurrently energizing said first and second heat sources to accelerate the increase in temperature of said member relative to that of said object being heated, a third heat source in good heat transfer relation with said member, and presettable means for effecting a desired heat transfer from said third source to said member for raising the temperature of said member toward said predetermined level.

12. A device for sensing and reacting to temperature changes in an object being subjected to heat input from one heat source, said device comprising a structure contacting said object for intimate heat transfer therebetween, a member of said structure constructed of material normally paramagnetic, a magnet, said member being normally attracted by said magnet, said member capable of becoming diamagnetic at temperatures above a predetermined level whereby there is a condition of non-attraction between said magnet and said member, an electric circuit for energizing said one heat source, an electromagnetic relay in said circuit, a circuit for operating said relay between circuit opening and closing conditions responsive to the magnetic condition of said member, a secondary heat source of comparatively lesser heat input capability than said one heat source, said secondary heat source being disposed in good heat transfer relation with said member, and electric circuit means for energizing said second heat source, said last named circuit means including said relay, whereby said one heat source and said second heat source may be established in concurrent operation to thereby raise the temperature of said member at a rate faster than that effected solely by heat transfer from said object.

References Cited in the file of this patent
UNITED STATES PATENTS

| | | |
|---|---|---|
| 2,207,871 | Myers | July 16, 1940 |
| 2,776,353 | McCabe | Jan. 1, 1957 |